Nov. 21, 1967  T. C. BOBERG  3,353,593
STEAM INJECTION WITH CLAY STABILIZATION
Filed Dec. 27, 1965  2 Sheets-Sheet 2

THOMAS C. BOBERG *INVENTOR.*

BY *Gary C. Honeycutt*

ATTORNEY

United States Patent Office 3,353,593
Patented Nov. 21, 1967

3,353,593
STEAM INJECTION WITH CLAY
STABILIZATION
Thomas C. Boberg, Houston, Tex., assignor to Esso
Production Research Company, a corporation of
Delaware
Filed Dec. 27, 1965, Ser. No. 516,469
7 Claims. (Cl. 166—4)

This invention relates to the thermal stimulation of oil wells by steam injection, and to the steam flooding of oil reservoirs. The invention is particularly concerned with a method for stabilizing reservoir clays by injecting an aqueous solution of polyvalent cation obtained from the operation of ion exchange towers used to soften the feed water for such steam generation. In a specific embodiment, the invention is also directed to the processing of the underflow water from a steam separator, in preparation for its use in the regeneration of such ion exchange towers.

In the recovery of heavy petroleum crude oils from wells, the industry has for many years recognized the desirability of thermal stimulation as a means for lowering the oil viscosity to thereby increase a well's productivity, and steam flooding as a means of increasing oil recovery. A form of thermal stimulation which has recently received wide acceptance by the industry is the process of injecting steam in the well and into the reservoir for a limited period of time and then allowing the well to produce. Subsequent cycles of steam injection and oil production are repeated as necessary. The steam stimulation of an oil well in this manner typical requires a steam generation capacity of about 5,000 to 50,000 pounds per hour or more.

A major problem in achieving continuous high capacity steam generation is the requirement that the feed water passed to the steam generators be low in oxygen content, low in total hardness, and have a pH of 7 to 11, to avoid fouling the generator coils by corrosion or the accumulation of boiler scale and other deposits. A particularly suitable means for softening the feed water is to pass raw filtered water through a series of ion exchange towers. Typically, the ion exchange resin or zeolite used for this purpose is initially supplied in the sodium form. As the raw filtered water passes through the ion exchange towers, calcium and magnesium and other undesirable cations are exchanged for sodium ions. In consequence, the effluent from the ion exchange towers is softened, i.e., made calcium- and magnesium-free. The ion exchange towers must thereafter be regenerated from time to time to restore the resin or zeolite to its sodium form. Normally, a sodium salt in solution, preferably sodium chloride, is used for this purpose.

A further problem sometimes encountered in connection with steaming operations is the tendency of certain clays in the formation, particularly montmorillonite, to swell and plug the pore space of the formation upon contact with fresh water. Swelling can be prevented by conversion of the clay to calcium, magnesium, or other divalent or polyvalent metal forms. Such conversion can be achieved by flushing aqueous solutions of divalent or polyvalent metal salts through an oil sand containing such clays.

It is an object of the present invention to achieve an efficient regeneration of ion exchange towers used in the pretreatment of steam generator feed water, while at the same time reducing or eliminating the need for an extraneous supply of sodium chloride. More particularly, it is an object of the invention to provide an improved method for the efficient recovery and recycle of soft brine for the regeneration of the ion exchange towers, and at the same time to provide a treating solution for stabilizing reservoir clays in connection with steam stimulation and steam flooding.

In accordance with one embodiment of the invention, the underflow from the steam separator is passed to a flash tank for the removal of low pressure steam, and the remaining water phase is passed to an auxiliary boiler for further concentration of the dissolved solids contained therein. In accordance with an alternate embodiment of the invention, the flash tank bottoms are recycled through the main steam generator for an initial period until the dissolved solids content of the flash tank bottoms is increased to a concentration which is suitable for the regeneration of the ion exchange towers. In accordance with either of these embodiments, at least a portion of the effluent stream obtained from the regeneration of the ion exchange towers is introduced into the injection well, either before or during steam injection, for stabilizing reservoir clays.

Figure 1:
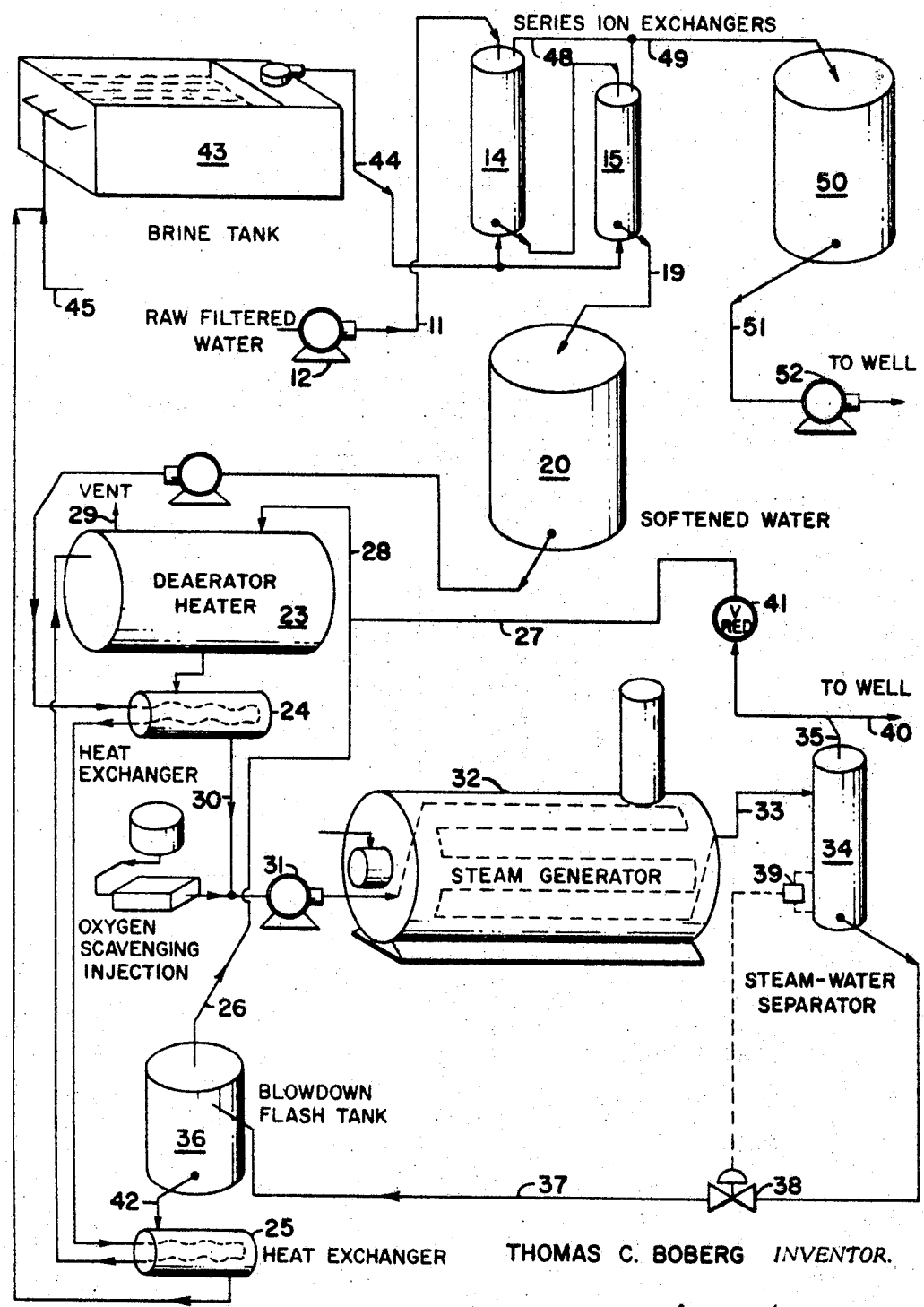
FIGURE 1 is a schematic flow process diagram illustrating one embodiment of the invention.

As illustrated by FIGURE 1, raw filtered water is passed through line 11 by means of pump 12. The feed stream is then passed through ion exchange towers 14 and 15. Each of the ion exchange towers is packed with a cationic exchange resin or zeolite, such as Dowex 50 of Dow Chemical Company or Amberlite 100 of Rohm & Haas Company. Dowex 50 is a sulfonated copolymer of styrene and divinylbenzene. Amberlite 100 is a sulfonated phenol-formaldehyde resin. The ion exchange towers function to remove calcium and magnesium salts, and minor amounts of other dissolved salts which contribute to total hardness. The number and arrangement of the towers, and the manner of placing the ion exchanger therein, depends in part upon the quality of the water to be treated. Such arrangement and handling of the resin or zeolite are well known to those skilled in the art.

The softened effluent from the ion exchange towers is passed through line 19 to storage tank 20. As needed, softened water is then passed from tank 20 through heat exchangers 24 and 25 before entering deaerator-heater 23. Additional heat for deaeration of the feed water is supplied to heater 23 as steam passing through line 28. The expelled air and other gaseous impurities are vented through line 29. The softened deaerated water is then passed through heat exchanger 24, line 30, and pump 31 to a gas-fired steam generator 32. The effluent from the steam generator, passing through line 33, generally consists of 70–90% quality steam. In separator 34, the effluent is separated into 98–99% quality steam passing overhead through line 35, with underflow water being passed to blow-down flash tank 36 by means of line 37 and valve 38, the latter being controlled by liquid level sensing means 39. The major proportion of the steam produced is passed by way of line 40 to the well or wells being stimulated. A minor proportion of the steam is passed by means of valve 41 and line 27 to the deaerator heater as previously indicated, to supply necessary heat to the deaerator heater. The low pressure blow-down steam passes overhead from tank 36 through line 26 where it is combined with steam from line 27 and passed through line 28 to the deaerator heater, also as previously indicated. The underflow from tank 36 may be discarded, or may be passed through line 42 to heat exchanger 25 and then passed to brine tank 43.

All the brine, or any portion thereof, required for regeneration of the ion exchange towers may be obtained from separate sources and supplied to tank 43 through line 45.

Periodically, the ion exchange resin or zeolite contained in towers 14 and 15 becomes exhausted or saturated with calcium and magnesium ions and other cations which contribute to hardness. At such times, flow through line 11 and pump 12 is diverted to an alternate series of towers (not shown). Regeneration is then achieved for towers 14 and 15 by passing brine from tank 43 through line 44. The brine is directed to towers 14 and 15 for regeneration, and the regeneration effluent is discharged through lines 48 and 49. The operation, of course, can be varied to suit other tower arrangements, as known to those skilled in the art.

The regeneration effluent, which contains substantial amounts of calcium and magnesium ions, is passed through lines 48 and 49 and stored in tank 50. As needed, in accordance with the invention, the solution stored in tank 50 is thereafter passed to a well via line 51 and pump 52, and injected for the purpose of minimizing clay swelling. If desired, the solution may be heated before injection into the reservoir.

Calcium and magnesium ions are far more effective than sodium to stabilize formation clays, as demonstrated in the following report: Monaghan, P. H.; Salathiel, R. A.; Morgan, B. E.; and Kaiser, A. D., Jr., "Laboratory Studies of Formation Damage in Sands Containing Clays," J. Pet. Tech., 216, 209 (1959). Accordingly, the method of the present invention is more effective than the prior art practice of injecting the total effluent from the steam generator, including both vapor and liquid phases, without separation, since the boiler effluent normally contains no calcium or magnesium ions.

The embodiment of FIGURE 1 is included for purposes of illustration only, and is not to be construed as limiting the scope of the invention. For example, those skilled in the art will recognize that deaerator-heater 23 may sometimes be omitted, or replaced by equivalent deaeration means. Also, steam generator 32 may be replaced by other steam generation means, such as an oil-burning, recirculating boiler. The embodiments of FIGURES 2 and 3 are similarly illustrative and not limiting.

Figure 2:
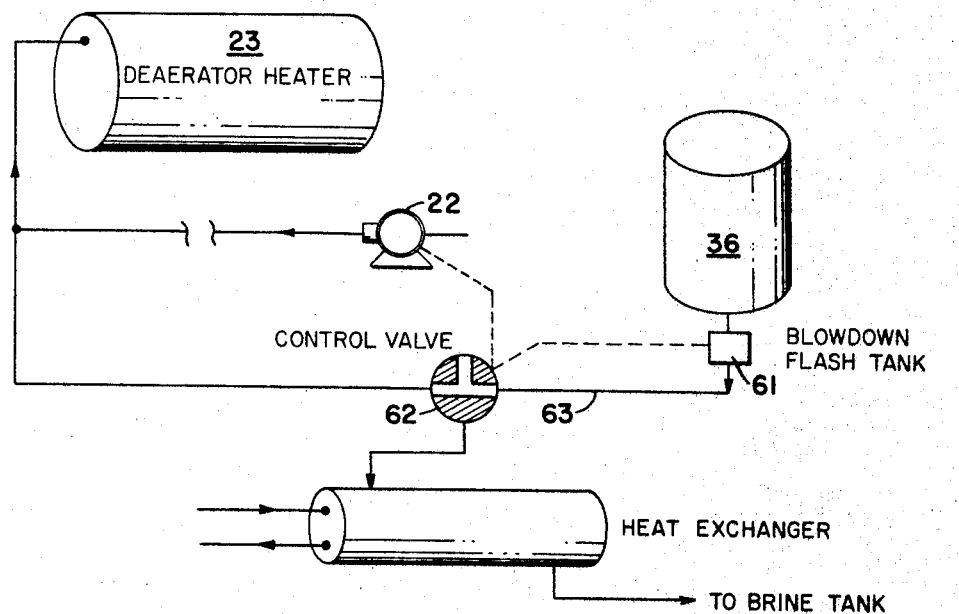
FIGURE 2 is a process flow diagram showing a first modification of the embodiment of FIGURE 1.

In FIGURE 2, a modification of the embodiment of FIGURE 1 is shown, which involves an alternate method of obtaining regeneration brine from blowdown tank 36. In this system, the bottoms stream removed from flash tank 36, or a portion thereof, is passed through line 63 and electrical conductivity cell 61, which determines the total dissolved solids content of the bottoms stream. Control valve 62, also located in line 63, is operated in response to the conductivity determination whereby the bottoms stream from tank 36 is recycled through deaerator-heater 23 during periods of conductivity measurement which correspond to a dissolved solids content falling below a predetermined value. This control system also actuates pump 22, such that as valve 62 opens, flow through pump 22 is cut by corresponding amount. Thus, total input flow to deaerator 23 is held constant.

A recycle of the bottoms stream in this manner achieves a progressively higher concentration of dissolved solids in the stream passed to generator 32 through line 30 by means of pump 31. As a result, the underflow from separator 34 also contains a progressively increased concentration of dissolved solids. Soon, the dissolved solids content in the underflow from flash tank 36 attains a level which is suitable for use in the regeneration of the ion exchange towers. At such time, control valve 62 is switched to its alternate position, thereby stabilizing flow through line 63 and diverting the proper amount of flash tank bottoms through line 42, heat exchanger 25, and then to brine tank 43. As before, regeneration effluent in lines 48 and 49 is collected for use in stabilizing formation clays in the well or wells receiving steam.

Figure 3:
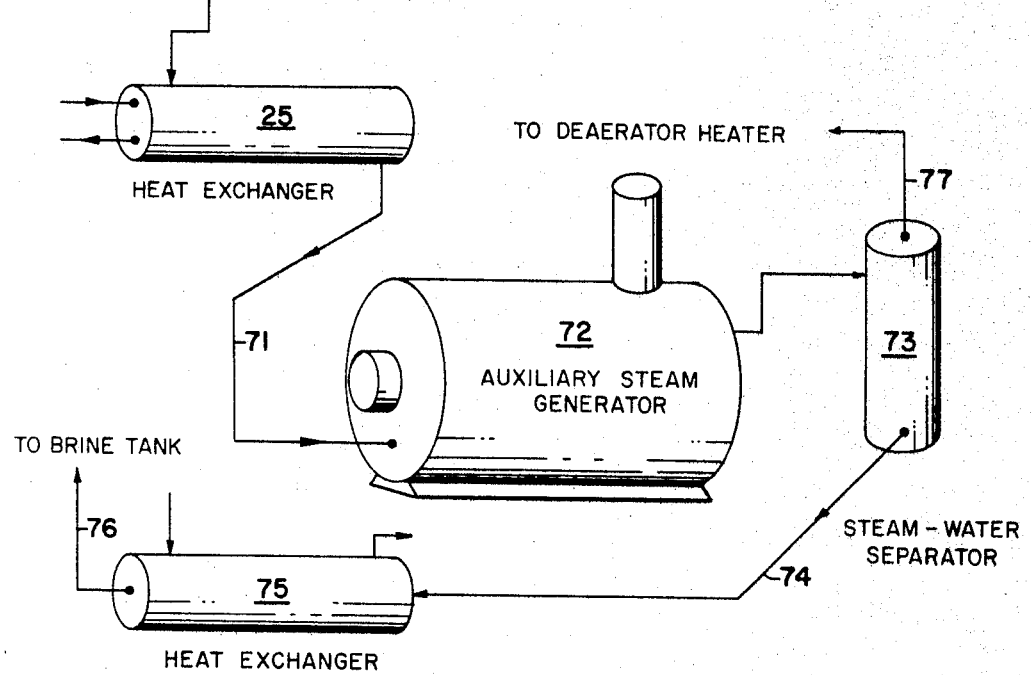
FIGURE 3 is also a process flow diagram, illustrating an alternate modification of the embodiment of FIGURE 1.

FIGURE 3 represents a second modification of the embodiment shown in FIGURE 1. In accordance with this embodiment, the underflow from flash tank 36 is passed through heat exchanger 25 and line 71 into an auxiliary steam generator 72. The effluent from steam generator 72 is passed to separator 73. The underflow from separator 73 (passing through line 74) has, of course, an increased concentration of dissolved solids with respect to the stream passing through line 71. Stream 74, which now contains a suitable concentration of dissolved solids for use in the regeneration of the ion exchange towers, is passed through heat exchanger 75 and line 75 to brine tank 43. The overhead from separator 73 is passed through line 77 as a source of heat supplied to deaerator 23.

The method of the invention is applicable whenever steam is injected into a clay-containing porous reservoir. In the recovery of oil, two general classes of steaming operations are practiced: steam stimulation and steam flooding. Stimulation is typically a "single-well operation," i.e., each producing well may be subjected to alternating cycles of injection and production, without necessarily affecting adjacent wells. Steam flooding, or steam drive, is conducted with the use of a well pattern, each injection well and each production well generally retaining its initial character throughout the flood.

Referring again to FIGURE 1, a specific example of the invention is illustrated by Table I which presents a hypothetical set of water analyses, showing the concentration of various ions in parts per million (by weight) in certain process streams of the embodiment of FIGURE 1. Of particular significance is the high content of $Ca^{++}$ and $Mg^{++}$ in the regeneration effluent, to be used for clay stabilization.

TABLE I

| | Raw Water (Line 11) (p.p.m.) | Softened Water (Line 19) (p.p.m.) | Brine (Line 44) (p.p.m.) | Regeneration Effluent (Line 51) (p.p.m.) |
|---|---|---|---|---|
| Sodium | 233 | 296 | 34,576 | 10,661 |
| Calcium | 14 | | | 5,276 |
| Magnesium | 25 | | | 9,422 |
| Total Cations | 272 | 296 | 34,576 | 25,359 |
| Bicarbonate | 9 | 9 | 9 | 9 |
| Carbonate | 1 | 1 | 1 | 1 |
| Sulfate | 47 | 47 | 47 | 47 |
| Chloride | 420 | 420 | 53,273 | 53,273 |
| Silica | 1 | 1 | 1 | 1 |
| Total | 750 | 774 | 87,907 | 78,690 |

In the embodiment illustrated by Table I, the blowdown flash tank bottoms stream (line 42) is discarded, rock salt (NaCl) is obtained from an extraneous supply, and water for brine tank 43 is supplied from tank 20 via line 45.

An alternate embodiment is illustrated by the analyses of Table II, obtained from a hypothetical operation in accordance with FIGURE 1, with the blow-down flash tank bottoms stream (line 42) being used as the sole source of brine for regenerating the ion exchange medium in towers 14 and 15. Note particularly that the raw feed water in this instance contains about five times the amount of total solids present in the case of Table I, due both to increased hardness and to increased amounts of sodium chloride.

TABLE II

| | Raw Water (Line 11) (p.p.m.) | Softened Water (Line 19) (p.p.m.) | Brine (Line 44) (p.p.m.) | Regeneration Effluent (Line 51) (p.p.m.) |
|---|---|---|---|---|
| Sodium | 1,175 | 1,523 | 12,691 | 9,792 |
| Calcium | 72 | | | 600 |
| Magnesium | 140 | | | 1,167 |
| Bicarbonate | 42 | 42 | 350 | 350 |
| Carbonate | 20 | 20 | 166 | 166 |
| Sulfate | 250 | 250 | 2,084 | 2,084 |
| Fluoride | 1 | 1 | 9 | 9 |
| Chloride | 2,150 | 2,150 | 17,916 | 17,916 |
| Total | 3,850 | 3,986 | 33,216 | 32,084 |

In the example of Table II, generator 32 is designed for an output of 30,000 lbs/hr. of 80% quality steam. Exchange tower 14 has a capacity for treating about 60 gallons of raw water per minute. Such capacity is readily provided by 1.5 tons of zeolite or resin as the ion exchange medium. Exchange tower 15 should contain about 0.4 tons of zeolite. Consistent with this capacity of steam generation and ion exchange, storage vessel 20 should be of approximately 300 bbls. capacity.

The analysis of line 42 is based on operating conditions in flash tank 36 which provide an overhead flow rate of 2400 lbs/hr., and a bottoms flow of 3600 lbs/hr. At these flow rates, more underflow is available in line 42 than is required for regeneration of the ion exchange medium. The excess brine thereby made available in tank 43 may be combined with the regeneration effluent in tank 50, if desired.

Heat exchange 24 and 25, and deaerator 23 are of conventional design, having a capacity of 30,000 lbs/hr.

A suitable steam generator 32, for example, is one which contains a forced circulation water vaporizer with a single-pass helical continuous coil, either horizontal or vertical, with a maxium coil working pressure of 2500 p.s.i.g. Inlet water temperature to the generator is approximately in the range of 200-220° F.

The generator vessel is suitably equipped with a package burner assembly consisting of a burner, fuel firing equipment, combustion air fan, fan drive, flame safeguard, and safety equipment with combustion controls. The burner must have a heat release compatible with the feed water input to provide a maximum of 30,000 lbs/hr. of steam output. A suitable design burns natural gas with a net heating value of 1100 B.t.u. per s.c.f. Alternate burner systems may also be used which burn fuel oil, crude oil, or other combustible fluids.

Separator 34 is capable of discharging 10-30% of the steam-water mixture as underflow through line 37 with 98-99% quality steam passing overhead through line 35. Blow-down flash tank 36 is of conventional design having a capacity necessary to handle the underflow from separator 34 at a pressure of approximately 50 p.s.i.g.

With the system operating at capacity, the amount of regeneration brine supplied by tank 43 must be equivalent to about 1.2 short tons of 98% quality rock salt per day. The entire volume of brine required for regeneration may be supplied from the recycle brine passing as underflow from flash tank 36 through line 42.

Referring again to FIGURE 2, the initial concentration of dissolved solids passing as underflow from flash tank 36 depends primarily upon the initial composition of the raw feed water. That is, some feed waters, in addition to hardness, contain substantial amounts of sodium chloride or other monovalent cation-comprising salts which do not contribute to total hardness. In the processing of raw feed water which contains more than about 0.4% of such salts, litle or no recycle of flash tank bottoms by way of line 63 will be necessary. Specifically, a direct return of flash tank bottoms to the brine tank as shown by FIGURE 1 may suffice. However, the embodiment of FIGURE 2 is intended to insure the recovery of a soft brine having a sufficient concentration of salts for use as a regenerating medium in the event the underflow from the underflow of flash tank 36 does not initially contain a sufficient concentration of dissolved solids.

In order to determine the suitability of the flash tank bottoms for immediaae recycle to brine tank 43, some analysis of the stream to determine its dissolved salt content is necessary. A suitable analysis is provided by a commercially available conductivity cell indicated diagrammatically at block 61. A suitable conductivity cell may be obtained from the Foxboro Co., as described in Foxboro Bulletin 19-13, or from Leeds and Northrup Co., as described in Data Sheet N-56(1).

Control valve 62 is shown in its recycle position as illustrated in FIGURE 2. This position corresponds to an analysis by cell 61 which indicates a dissolved solids content which is too low for passage to brine tank 43. Accordingly, the flash tank bottoms in line 42 are directed by way of line 63 back to deaerator 23 to be again passed through the steam generator along with additional feed water supplied by pump 22. In this regard, the operation of control valve 62 must be coordinated with pump 22 in order to provide the deaerator-heater 23 with a constant input flow rate corresponding to the desired output rate of steam through line 33. The coordination of control valves 62 with pump 22 is suitably achieved by transmitting the control signal from conductivity cell 61 simultaneously to both pump 22 and valve 62, as illustrated in FIGURE 2. For example, pump 22 may be an Oilwell Triplex plunger pump provided with a bypass on the pump discharge line with a control valve to regulate flow to the deaerator-heater and steam generator.

The mixture of blow-down recycle in line 63 with softened feed water supplied by pump 22 provides an increased dissolved solids content in the charge to the steam generator. Correspondingly, an increased dissolved solids content is also provided in the generator effluent and the underflow from separator 34. A continued recycle of blow-down bottoms through the steam generator soon provides a concentration of dissolved solids in the flash tank bottoms which is suitable for the regeneration of the ion exchange towers. This increased concentration is readily detected by conductivity cell 61, in response to which valve 62 is switched to its alternate position, thereby discharging flask tank bottoms through line 43 for return to brine tank 43

As an alternate embodiment, control valve 62 may be replaced by a continuous proportioning device whereby some fraction of the blow-down bottoms is continuously recycled and the remaining proportion continuously passed through heat exchanger 25 for return through line 42 to the brine tank.

Referring again to FIGURE 3, the auxiliary steam generator is primarily intended for use in processing a raw feed water which is somewhat deficient in dissolved sodium or other monovalent salts, thereby requiring a substantial concentration of dissolved solids in the blow-down bottoms. In this embodiment, steam generator 72, for example, will have a capacity of about 6,000 lbs./hr. to produce 70% quality steam at about 100 p.s.i.g. Accordingly, the dissolved solids concentration in line 74 will be approximately 2.3 times as great as the dissolved solids content passing through line 71 to the steam generator. In this manner, a continuous flow of soft regeneration brine through line 76 is possible even though the concentration in line 42 may be quite low.

In some instances, the brine recycled to tank 43 by way of line 42 (FIGURES 1 and 2) or by way of line 76 (FIGURE 3) may contain a concentration of sulfate ion which is sufficient to form a precipitate of calcium sulfate upon contact with the spent exchange resin. Preferably, therefore, the brine stored in tank 43 should periodically be tested, for example, by actual contact with a sample of spent ion exchange material in order to determine whether such a precipitate will form.

In the event the formation of calcium sulfate is found to occur, the sulfate ion is easily removed by passing the brine through an anionic resin using the salt-splitting technique. Salt-splitting consists of regenerating a strong anionic resin with sodium chloride solution. The resin exchanges chloride ion for the bicarbonate silicas and sulfate ions. The spent resin, on contact with sodium chloride brine, is regenerated by releasing the entrapped ions in exchange for a new supply of chloride ions.

In accordance with any of the foregoing embodiments, the regeneration effluent may be supplemented by the addition of calcium and/or other divalent or polyvalent cations, or other treating agent compatible therewith, to further improve the effectiveness of the method. Moreover, it may be desirable to divert at least a portion of the magnesium to other profitable uses, and rely primarily upon the remaining calcium ion to achieve clay stabilization.

The method of the invention may be further improved by the addition of suitable thickeners and/or surface active agents to the injected steam, or to the regeneration effluent.

It is highly desirable in many instances to mount the entire system of the invention on a portable base, whereby the equipment may be moved from one location to the other as needed. As an example of this, the complete system may be placed on a barge for use in the stimulation of offshore wells. In practice, such a barge-mounted installation would be towed to a well to be stimulated, and preferably to a well being produced by gas-lift. The gas-lift connection to the well would be transferred to the barge-mounted installation and connected to a turbo-expander mounted on the barge. The gas would then be passed through the deaerator to strip oxygen from the boiler feed water and then be passed into the boiler at a relatively low pressure. The power developed by the turbo-expander is thereby made available to operate the boiler feed water pump, fans, pumps for the water treating equipment, and for other miscellaneous uses.

For portable use on land, the entire system can readily be skid-mounted or placed on other mobile platforms in order to facilitate a transfer of equipment from one well site to another.

What is claimed is:

1. A thermal method for the recovery of oil from a porous subterranean oil-bearing reservoir which comprises in combination the steps of softening hard water by exchanging monovalent cations for at least a portion of the cations which contribute to the hardness of said water, generating steam from at least a portion of the resulting soft water, injecting at least a portion of said steam into the reservoir, and also injecting into the reservoir at least a portion of the cations removed from said hard water, and producing oil from said reservoir.

2. A method as defined in claim 1 wherein said reservoir has both an input and an output well, wherein said steam and said replaced cations are injected into the reservoir by way of said input well and reservoir oil is produced from said output well.

3. A method as defined in claim 1 wherein both said injection steps are carried out in the same well of said reservoir, and wherein the subsequent production of oil from said reservoir is carried out by a reversal of flow at said well.

4. A method as defined in claim 1 wherein said hard water is treated with a cationic exchange medium to produce said softened water, and further comprising the steps of deaerating said softened water, passing said softened, deaerated water through a steam generation zone to produce a steam-water mixture, separating said mixture to produce a stream of high quality steam and a solution of dissolved solids in water, concentrating said solution and contacting said cationic exchanger with the resulting concentrated solution, thereby regenerating at least a portion of said cationic exchange medium.

5. A method as defined by claim 4 wherein a substantial proportion of the resulting softened water is vaporized in a high pressure steam generation zone, and further comprising the steps of separating the effluent from said steam generation zone into high quality, high pressure steam and flashing said separated water at a substantially reduced pressure to produce low pressure steam and a water phase further concentrated in dissolved solids, passing the water phase from said flashing step to a low pressure steam generation zone, separating the resulting effluent into low pressure steam and water further concentrated in dissolved solids and regenerating at least a portion of said ion exchanger with the resulting water phase from the step of separating the effluent from said low pressure steam generation zone.

6. A method as defined by claim 1 wherein a substantial portion of said softened water is vaporized in a steam generation zone to produce a steam-water mixture, separating said mixture into a stream of high quality, high pressure steam and a soft water stream containing a substantial concentration of dissolved solids, flashing said separated water at a substantially reduced pressure with respect to the pressure of said steam generation zone, analyzing the liquid phase which remains after said flashing step to determine its suitability as a regeneration medium for said ion exchange medium, and recycling said water phase to said steam generation zone in response to an analysis which shows the dissolved solids content of said water phase to be inadequate for such regeneration.

7. A method as defined by claim 6 further comprising the steps of separating the effluent from said steam generation zone into high quality steam plus a first separated water phase, flashing said first water phase at a substantially reduced pressure with respect to the pressure of said steam generation zone, thereby producing low pressure steam and a second separated water stream, analyzing said second separated water stream for dissolved solids content, and recycling said second separated water stream to said steam generation zone in response to an analysis indicating that the dissolved solids content of said second water stream is inadequate to provide suitable regeneration of said cationic exchanger, whereby the dissolved solids content of said second separated water phase is progressively increased, and contacting said cationic exchanger with said second separated water phase whenever the dissolved solids content thereof become adequate.

References Cited

UNITED STATES PATENTS

| | | | |
|---|---|---|---|
| 3,042,114 | 7/1962 | Willman | 166—40 X |
| 3,123,135 | 3/1964 | Bernard et al. | 166—9 |
| 3,141,501 | 7/1964 | Bernard et al. | 166—9 |
| 3,193,009 | 7/1965 | Wallace et al. | 166—40 X |
| 3,259,186 | 7/1966 | Dietz | 166—40 X |
| 3,292,702 | 12/1966 | Boberg | 166—40 |

OTHER REFERENCES

Crawford, "Water Processing for Thermal Oil Recovery Programs," Producers Monthly, vol. 29, No. 4, April 1965, p. 18.

Hagist et al., "Water Treatment for Thermal Recovery," The Oil and Gas Journal, vol. 63, No. 2, Jan. 11, 1965, pp. 64–70.

STEPHEN J. NOVOSAD, *Primary Examiner.*